United States Patent [19]

Bardet

[11] 4,061,451
[45] Dec. 6, 1977

[54] INSTALLATION FOR THE ZONAL TREATMENT OF ELONGATED PRODUCTS

[75] Inventor: Gérard Bardet, Paris, France

[73] Assignees: Automatisme & Technique, Sevres; Desmarquest & C. E.C., Arcueil, both of France

[21] Appl. No.: 622,744

[22] Filed: Oct. 15, 1975

[30] Foreign Application Priority Data

Oct. 21, 1974 France .............................. 74.35332

[51] Int. Cl.$^2$ ............................................ B29C 17/02
[52] U.S. Cl. .................................... 425/66; 425/174.2; 264/23; 65/268
[58] Field of Search ....................... 425/66, 324 R, 404, 425/445, 446, DIG. 200, DIG. 201, 174.6, 174.8, 392, 174.4, 174, 174.2; 65/111, 268; 264/23, 26

[56] References Cited

U.S. PATENT DOCUMENTS

| 2,537,193 | 1/1951 | Shaw | 425/174.8 |
|---|---|---|---|
| 2,552,108 | 5/1951 | Molinari | 65/268 |
| 2,583,330 | 1/1952 | Eickert | 425/404 |
| 2,587,930 | 3/1952 | Uschmann | 425/174.8 |
| 3,188,983 | 6/1965 | Tomberg | 425/404 X |
| 3,299,468 | 1/1967 | Moore | 425/392 X |
| 3,516,885 | 6/1970 | Sexstone et al. | 264/26 X |
| 3,522,341 | 7/1970 | Coplan et al. | 425/66 X |
| 3,522,342 | 7/1970 | Nungesser et al. | 425/66 X |
| 3,635,621 | 1/1972 | Mlyauchi et al. | 425/445 X |
| 3,791,906 | 2/1974 | Farkas | 264/26 X |
| 4,012,213 | 3/1977 | Haggerty et al. | 425/174.4 |

Primary Examiner—Robert L. Spicer, Jr.
Attorney, Agent, or Firm—Jones, Thomas & Askew

[57] ABSTRACT a. Treatment installation more particularly comprising a zonal heating system for elongated products, such as bars, tubes or wires made from inorganic material.

b. This installation is characterized in that it comprises at least one introduction and supporting device for the product to be treated, at least one extraction and supporting device for that treated product and at least one treatment device traversed by the product, whereby at least one of these treatment devices is an enclosure in which there is an ultra-high frequency electromagnetic field.

c. The invention applies more particularly to drawing glass wires.

7 Claims, 2 Drawing Figures

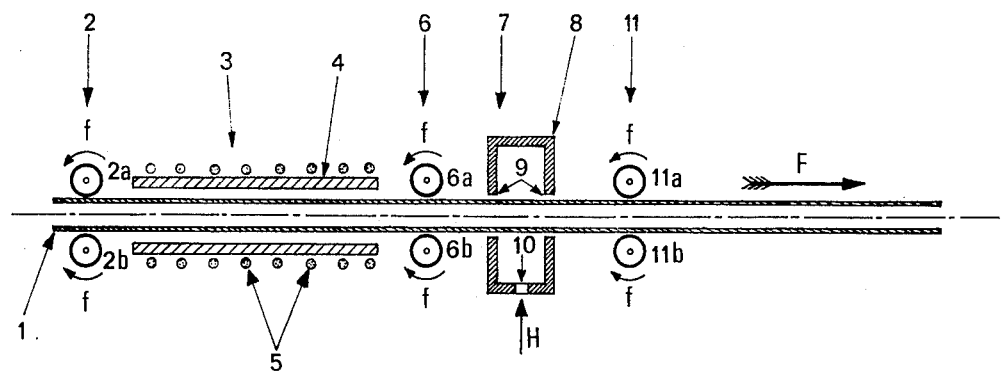
Fig_1
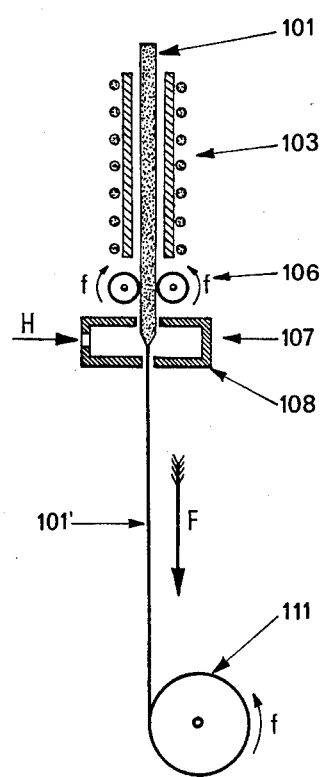
Fig_2

INSTALLATION FOR THE ZONAL TREATMENT OF ELONGATED PRODUCTS

The invention relates to a treatment installation, comprising more particularly a zonal heating system for elongated products, such as bars, tubes or wire made from inorganic material.

In industry it is frequently necessary to treat elongated products, such as bars, tubes or wires and in numerous cases this treatment, alongside other operations e.g. of a chemical or mechanical nature, comprises an operation consisting of heating the product to a temperature which, particularly in the case of inorganic products, can be very high, e.g. well above 1000° C. Moreover, it can be useful and in certain cases absolutely necessary that this heating is at a given time limited to a narrow zone, i.e. to a small portion of the length of the product, whereby this distance measured along the product axis may be only a few centimeters or even less.

Conventional means for obtaining such a heating consist either of bringing the product into contact with a flame or exposing it to the thermal radiation of a source whose temperature is higher than the temperature to be reached on the product and which can, for example, comprise electrical resistors. However, these different means make it difficult to localise the heating within a narrow zone and also have a deplorable energy deficiency. These also impose constraints, which are sometimes unfavourable for the result sought in the treatment in connection with the composition of the atmosphere in the product heating area. These difficulties increase with the temperature and often become insurmountable at very high temperatures.

Another conventional means comprises producing eddy currents in the product to be heated by arranging electrical circuits close to the product and which are traversed by an alternating electrical current whose frequency can reach several hundred Hertz. However, this is only possible in the case where the electrical conductivity of the product to be heated is adequate. For example, it could not be used if the product to be heated is a glass or ceramic material.

The object of the invention is to obviate these disadvantages. To this end the invention relates to the treatment installation comprising more particularly a zonal heating system for elongated products, such as bars, tubes or wires made from inorganic material, characterised in that it comprises at least one introduction and supporting device for the product to be treated, at least one extraction and supporting device for the treated product and at least one treatment device, traversed by the product, whereby at least one of these treatment devices is an enclosure wherein there is an ultra-high frequency electromagnetic field.

The invention will be explained in greater detail hereinafter with reference to two embodiments shown in the attached drawings wherein:

FIG. 1 shows schematically an installation for fritting tubes, for example of alumina.

FIG. 2 schematically shows an installation for drawing wires, for example of glass or silica.

FIG. 1 schematically shows an installation for fritting tubes such as alumina tubes. These tubes are made by extrusion from a paste constituted by an alumina powder agglomerated by binders. These tubes are then pre-frittered to a temperature of about 1000° C, the object of this prefritting operation being to eliminate the binders and give the material a minimum of cohesion so as to permit the manipulation of the tube. The tube is then treated in the installation shown in FIG. 1.

This installation comprises at its left-hand end an introduction and supporting device 2 comprising at least one pair of rollers 2a and 2b rotating in the direction of the arrows $f$ and which drive the tube 1 in the direction of the arrow F.

The thus driven tube 1 passes into a preheating device 3 comprising a refractory sleeve 4 surrounded by electrical resistors 5. Obviously this system is completed towards the outside by a not-shown thermal insulation. The object of this pre-heating device is to raise the tube temperature to about 1000° C.

At the outlet from the pre-heating device 3 there is a second introduction and supporting device 6 with its rollers 6a and 6b rotating in the direction of arrows $f$ in appropriate synchronism with rollers 2a and 2b.

The tube then enters a fritting device 7 substantially comprising a cavity resonator 8 made from a conductive material such as metal. This cavity resonator assumes the shape of a tube having a circular cross-section coaxial to tube 1 to be fritted and whose length, parallel to the axis of tube 1 is reduced to the minimum value below which electrical breakdown phenomena will occur. The cavity resonator is closed at its ends, with the exception of opening 9 permitting the passage of tube 1. An orifice 10 in the wall of the cavity resonator parallel to the axis of tube 1 permits the coupling of the cavity resonator with the generator of the ultra-high frequency electromagnetic field H in the frequency range of 300–3000 megacycles. The diameter of the tube constituting the cavity resonator is designed to aid the excitation of a resonant mode $TM_{mno}$ inside the same, making it possible to obtain a concentration of the ultra-high frequency of the energy in the walls of the tube to be fritted. Consequently, the tube 1 to be fritted is heated to the fritting temperature of about 1700° C in a very narrow and perfectly defined zone (hatched in FIG. 1).

At the outlet of fritting device 7 the tube is collected by the extraction and supporting device 11, which, with its rollers 11a and 11b drives the tube 1 in the direction of arrow F. Obviously, various modifications can be made to the arrangement described hereinbefore without passing beyond the scope of the invention. For example, other rollers or supporting means can be provided. It is also possible to modify the length of the pre-heating device 3 or provide several such devices. It is also not impossible to use these devices for pre-fritting the tube, making it possible to supply the installation according to the invention directly with the alumina tube coming from the extruder. It is finally possible to replace the cavity resonator by a wave guide in which are propagated non stationary ultra-high frequency electromagnetic waves, whereby the length of this wave guide is adjusted as a function of the length of the zone to be treated. However, in this solution the energy efficiency of the installation is less satisfactory.

FIG. 2 schematically shows an installation for drawing a glass or silica wire from a bar 101. Initially bar 101 enters pre-heating device 103, which is schematically similar to device 3 of FIG. 1 and which will therefore not be described in detail here. The function of device 103 is to raise the bar temperature to a few hundred degrees centigrade, whilst remaining well below the fusion temperature of the material.

The bar is then carried along by the introduction and supporting device 106, in an analogous manner to device 6 in FIG. 1, the bar then enters the fusion device 107, whose task is to bring about, under the action of an ultra-high frequency electromagnetic field, the fusion of bar 101 in a clearly defined end area, so that a wire 101' can be drawn from this end of bar 101. Fusion device 107 substantially comprises a cavity resonator 108, whose general characteristics are very similar to those of cavity resonator 8 in FIG. 1 and which will not therefore be described in detail here. Advantageously the diameter of this cavity resonator is such that it aids the excitation of the resonant mode $TM_{010}$, permitting a concentration of the ultra-high frequency energy in the axis of the cavity, i.e. in the region wherein extends bar 101.

At the outlet of fusion device 107, wire 101' is taken up by an extraction and supporting device 111, which substantially comprises a drum onto which is wound wire 101'. Here again modifications analogous to those envisaged in the case of the installation of FIG. 1 are possible without passing beyond the scope of the invention. More particularly the cavity resonator can be replaced by a wave guide in which non-stationary waves are propagated.

In general manner the invention is not limited to the embodiments described and represented hereinbefore, and numerous variants can be made thereto without passing beyond the scope of the invention.

I claim:

1. Apparatus for heating a predetermined zone of an elongated product, comprising:
   means for introducing the elongated product to a predetermined zone of treatment;
   means for extracting the treated product from said predetermined zone of treatment;
   means at said predetermined zone defining a cavity resonator through which said elongated product passes along a longitudinal axis, said cavity resonator when supplied with ultrahigh frequency electromagnetic energy being operative to maintain stationary waves of a resonant mode at a fixed predetermined location occupied by said elongated product moving through said cavity resonator to obtain a concentration of said ultrahigh frequency energy in the elongated product within said zone; and
   means operative to supply ultrahigh frequency electromagnetic energy to said cavity resonator.

2. Apparatus as in claim 1, wherein said cavity resonator is operative to maintain stationary resonant mode $TM_{010}$ so as to obtain a concentration of energy in proximity to said longitudinal axis of said cavity resonator, so that said elongated product is heated by said ultrahigh frequency energy only in a predetermined zone on said axis.

3. Apparatus as in claim 2 further comprising means preceding said introducing means and operative to preheat said elongated product.

4. Apparatus as in claim 2, wherein said cavity resonator comprises a tube of substantially circular cross-section, said tube being coaxial to said elongated product and being partially closed at its ends, said tube having a diameter operative to maintain said resonant mode $TM_{010}$, and said tube having a length in the direction of product elongation which is substantially the minimum length below which electrical breakdown occurs within said cavity resonator.

5. Apparatus as in claim 1, in which said elongated product comprises a wire being drawn from a bar whose end area is maintained in the fusion state, wherein:
   said cavity resonator is operative to maintain stationary ultrahigh frequency electromagnetic waves of a resonant mode $TM_{010}$ along the longitudinal axis of said cavity resonator thereby providing a concentration of ultrahigh frequency energy to heat said wire moving along said longitudinal axis.

6. Apparatus as in claim 5 further comprising means preceding said introducing means and operative to preheat said bar.

7. Apparatus as in claim 5, wherein said cavity resonator comprises a tube of substantially circular cross-section, said tube being partially closed at its ends, said tube having a diameter operative to maintain said resonant mode $TM_{010}$, and said tube having a length in the direction of rod displacement which is substantially the minimum length below which electrical breakdown occurs within said cavity resonator.

* * * * *